(12) United States Patent
Zöls et al.

(10) Patent No.: US 10,690,154 B2
(45) Date of Patent: Jun. 23, 2020

(54) PIEZOHYDRAULIC ACTUATOR

(71) Applicant: Siemens Aktiengesellschaft, Munich (DE)

(72) Inventors: Wolfgang Zöls, München-Lochhausen (DE); Iason Vittorias, München (DE); Georg Bachmaier, München (DE)

(73) Assignee: METISMOTION GMBH, München (DE)

( * ) Notice: Subject to any disclaimer, the term of this patent is extended or adjusted under 35 U.S.C. 154(b) by 50 days.

(21) Appl. No.: 16/302,223

(22) PCT Filed: Apr. 21, 2017

(86) PCT No.: PCT/EP2017/059514
§ 371 (c)(1),
(2) Date: Nov. 16, 2018

(87) PCT Pub. No.: WO2017/198420
PCT Pub. Date: Nov. 23, 2017

(65) Prior Publication Data
US 2019/0271336 A1  Sep. 5, 2019

(30) Foreign Application Priority Data
May 20, 2016  (DE) .................. 10 2016 208 773

(51) Int. Cl.
*F15B 15/08* (2006.01)
*F15B 11/02* (2006.01)
(Continued)

(52) U.S. Cl.
CPC .......... *F15B 15/088* (2013.01); *F15B 11/022* (2013.01); *F15B 11/0325* (2013.01);
(Continued)

(58) Field of Classification Search
CPC ......... F15B 11/10; F15B 11/18; F15B 11/022; F15B 15/088; H02N 2/043
See application file for complete search history.

(56) References Cited

U.S. PATENT DOCUMENTS 9,587,609 B2 * 3/2017 Bachmaier ......... F02M 63/0026
9,625,000 B2   4/2017 Hoffmann
(Continued)

FOREIGN PATENT DOCUMENTS

CN  102971522 A  3/2013 ............. F02M 63/00
CN  104271961 A  1/2015 ............. F04B 17/00
(Continued)

OTHER PUBLICATIONS

Chinese Office Action, Application No. 201780039523.9, 5 pages, dated Sep. 26, 2019.
(Continued)

*Primary Examiner* — Nathaniel E Wiehe
*Assistant Examiner* — Richard C Drake
(74) *Attorney, Agent, or Firm* — Slayden Grubert Beard PLLC

(57) ABSTRACT

A piezohydraulic actuator system includes four chambers: a first chamber defined by a drive bellows filled with a hydraulic fluid and movable by a piezo actuator, a second chamber defined by a hydraulic cylinder filled with the hydraulic fluid, which defines a first output; a third chamber defined by an output bellows filled with the hydraulic fluid, which defines a second output; and a fourth chamber defining a reservoir of the hydraulic fluid. The drive bellows is hydraulically connected via a first check valve to the second chamber. A hydraulic piston in the hydraulic cylinder is coupled mechanically to the output bellows. The drive bellows is hydraulically connected via a second check valve to the fourth chamber. The hydraulic fluid reservoir is
(Continued)

hydraulically connected via a third check valve to the output bellows, and the hydraulic cylinder is hydraulically connected via a fourth check valve to the output bellows.

13 Claims, 3 Drawing Sheets

(51) Int. Cl.
*F15B 11/032* (2006.01)
*F15B 15/10* (2006.01)
*F15B 15/18* (2006.01)
*H02N 2/04* (2006.01)

(52) U.S. Cl.
CPC .............. *F15B 15/10* (2013.01); *F15B 15/18* (2013.01); *H02N 2/043* (2013.01)

(56) References Cited

U.S. PATENT DOCUMENTS

| | | | |
|---|---|---|---|
| 10,072,677 | B2 | 9/2018 | Bachmaier et al. |
| 10,355,622 | B2 | 7/2019 | Bachmaier et al. |
| 2010/0018829 | A1 | 1/2010 | Neelakantan et al. ...... 192/12 C |
| 2013/0269790 | A1* | 10/2013 | Bachmaier ......... F02M 63/0057 137/99 |
| 2015/0113976 | A1* | 4/2015 | Bachmaier ............. H02N 2/043 60/545 |
| 2016/0241166 | A1* | 8/2016 | Bachmaier ............. F16F 15/005 |
| 2016/0281747 | A1* | 9/2016 | Bachmaier ............. F15B 7/003 |
| 2019/0145432 | A1* | 5/2019 | Bachmaier ............... B25J 9/144 |
| 2019/0368515 | A1* | 12/2019 | Bachmaier ............. F15B 7/003 |

FOREIGN PATENT DOCUMENTS

| | | | | |
|---|---|---|---|---|
| CN | 104514833 | A | 4/2015 | ............... B60K 5/12 |
| CN | 105190051 | A | 12/2015 | ................ F15B 7/00 |
| DE | 10 2013 219 759 | A1 | 4/2015 | .............. F15B 15/18 |
| JP | 62028507 | A | 2/1987 | .............. F15B 15/08 |
| JP | 20003-14402 | A | 11/2000 | ................ F15B 7/00 |
| WO | 2014/001083 | A1 | 1/2014 | ............. F04B 17/00 |
| WO | 2015/044420 | A2 | 4/2015 | ............... H02N 2/04 |
| WO | 2017/198420 | A1 | 11/2017 | .............. F15B 11/02 |

OTHER PUBLICATIONS

Girard A. et al, "A Two-Speed Actuator for Robotics with Fast Seamless Gear Shifting," 2015 IEEE/RSJ International Conference on Intelligent Robots and Systems (IROS), Congress Center Hamburg, pp. 4704-4711, Sep. 28, 2015.

Jeong S.H. et al, "Dual-Mode Twisting Actuation Mechanism with an Active Clutch for Active Mode-Change and Simple Relaxation Process," 2015 IEEE/RSJ International Conference on Intelligent Robots and Systems (IROS), Congress Center Hamburg, pp. 5832-5837, Sep. 28, 2015.

German Office Action, Application No. 10 2016 208 773.8, 7 pages, dated Feb. 10, 2017.

International Search Report and Written Opinion, Application No. PCT/EP2017/059514, 20 pages, dated Sep. 19, 2017.

Japanese Office Action, Application No. 2018560511, 7 pages, dated Dec. 24, 2019.

* cited by examiner

PIEZOHYDRAULIC ACTUATOR

CROSS-REFERENCE TO RELATED APPLICATIONS

This application is a U.S. National Stage Application of International Application No. PCT/EP2017/059514 filed Apr. 21, 2017, which designates the United States of America, and claims priority to DE Application No. 10 2016 208 773.8 filed May 20, 2016, the contents of which are hereby incorporated by reference in their entirety.

TECHNICAL FIELD

The invention relates to a piezohydraulic actuator and to a method for operating same.

BACKGROUND

Four properties in particular are of importance in actuators, specifically force, deflection, speed and construction space. In many actuator applications there are different working points at which either a high force or high speed is required. In the case of an actuator for ejecting tools in a machine tool, the actuator has to cover the deflection until making contact with the tool at a great speed, with no particularly great forces being required. As soon as the actuator is in contact with the tool, the requirement is precisely the other way around. Great forces are required in order to be able to eject the tool. However, no great speed is required when the actuator deflection necessary for this purpose is very small. Two required modes therefore arise for the actuator. A speed mode and a force mode. Such a concept with these two modes is also used ever more frequently in robotics.

Use is customarily made of a two-stage transmission which provides a possibility of switching over between the two modes, specifically the speed mode and the force mode. The torque/force surges during the switching over, in particular under load, are disadvantageous here. [1] discloses a linear actuator which counteracts the problem with the aid of a transmission and an additional motor. ([1]: A. Girard and H. Asada—A Two-Speed Actuator for Robotics with Fast Seamless Gear Shifting, 2015 IEEE/RSJ International Conference on Intelligent Robots and Systems (IROS)). The complexity and the power density of such a system disadvantageously still need a high degree of optimization.

As alternatives, different actuator principles, such as, for example, cable drives, which can be used for realizing two different modes are customarily provided. For example, twisted cables have, inter alia, a nonlinear transmission ratio, and therefore twisted cables can also be used by means of an additional rotation for higher forces from same motor unit. The advantage of such a solution includes lower losses. However, the two modes are coupled to each other via a hysteresis-affected relaxation process. In order to counteract this effect, researchers have developed a clutch mechanism with an additional motor unit. (see [2]: Y. J. Shin, H. J. Lee, K.-S. Kim, S. Kim,—"Dual-Mode Twisting Actuation Mechanism with an Active Clutch for Active Mode-Change and Simple Relaxation Process", 2015 IEEE/RSJ International Conference on Intelligent Robots and Systems (IROS)). Such a system likewise increases the complexity of the overall system. The control of twisted cables and the nonlinearities associated therewith continues to be a research topic.

SUMMARY

One embodiment provides a piezohydraulic actuator which is designed as a system having four chambers, wherein a first chamber is a drive bellows which is movable by a piezo actuator and is filled with a hydraulic fluid and which is hydraulically connected via a first check valve to a second chamber, which is designed as a hydraulic cylinder filled with the hydraulic fluid, as first output, the housing and hydraulic piston of which are coupled mechanically in parallel to an output bellows, which is filled with the hydraulic fluid and forms a third chamber, as second output, wherein the drive bellows is hydraulically connected via a second check valve to a fourth chamber, which is filled with the hydraulic fluid, as a reservoir, wherein the latter is hydraulically connected via a third check valve to the output bellows, and the hydraulic cylinder is hydraulically connected via a fourth check valve to the output bellows.

In a further embodiment, the hydraulic cross section of the hydraulic piston is smaller than the hydraulic cross section of the third chamber produced as the output bellows and in particular is smaller than the hydraulic cross section of the first chamber produced as the drive bellows.

In a further embodiment, the fourth check valve is configured in such a manner that, when there is a rise in pressure in the first output as a result of an external counterforce, said fourth check valve opens in a such a manner that hydraulic fluid is additionally pumped to the second output.

In a further embodiment, the third check valve has a leakage for hydraulic fluid to drift back from the output bellows to the reservoir.

In a further embodiment, a restrictor for hydraulic fluid to drift back from the output bellows to the reservoir is hydraulically connected parallel to the third check valve.

In a further embodiment, the mechanical output is provided by means of a surface of the hydraulic piston.

In a further embodiment, the mechanical output is provided by means of a surface of the third chamber produced as the output bellows, wherein the hydraulic piston is connected, in particular in a form-fitting or force-fitting manner, to the surface of the output bellows.

In a further embodiment, the hydraulic cylinder and at least partially the hydraulic piston are positioned within the third chamber produced as the output bellows.

In a further embodiment, the piezo actuator is electrically activated by means of pulse width modulation of an activation voltage.

Another embodiment provides method for operating a piezohydraulic actuator which is designed as a system having four chambers, wherein a first chamber is a drive bellows which is movable by a piezo actuator and is filled with a hydraulic fluid and which is hydraulically connected via a first check valve to a second chamber, which is designed as a hydraulic cylinder filled with the hydraulic fluid, as first output, the housing and hydraulic piston of which are coupled mechanically in parallel to an output bellows, which is filled with the hydraulic fluid and forms a third chamber, as second output, wherein the drive bellows is hydraulically connected via a second check valve to a fourth chamber, which is filled with the hydraulic fluid, as a reservoir bellows, wherein the latter is hydraulically connected via a third check valve to the output bellows, and the latter is hydraulically connected by a fourth check valve to the hydraulic cylinder, wherein a compression, realized by means of the expansion of the piezo actuator, and pressing of the hydraulic fluid against the first check valve takes place, the latter opening at a set pressure and the hydraulic fluid flowing into the hydraulic cylinder and a multiplication or reduction of the piezo stroke being realized, wherein, by means of contraction of the piezo actuator, a negative pressure is generated in the drive bellows in such a manner that the second check valve opens and hydraulic fluid flows from the reservoir into the drive bellows and thus a repeatable pumping cycle is completed.

In a further embodiment, the third check valve opens when, as a result of the pumping of the hydraulic fluid into the hydraulic cylinder, a negative pressure is generated in the output bellows, and hydraulic fluid flows from the reservoir bellows into the output bellows.

In a further embodiment, if the first output moves against a settable counterforce, in particular an obstacle, and the pressure in the hydraulic cylinder increases, the fourth check valve opens and hydraulic fluid additionally flows from the drive bellows into the output bellows.

In a further embodiment, when the first output and the second output are retracted, hydraulic fluid flows back into the reservoir bellows by means of the third check valve.

BRIEF DESCRIPTION OF THE DRAWINGS

Example embodiments are described in greater detail below with reference to the drawings, in which.

DETAILED DESCRIPTION

Figure 1:
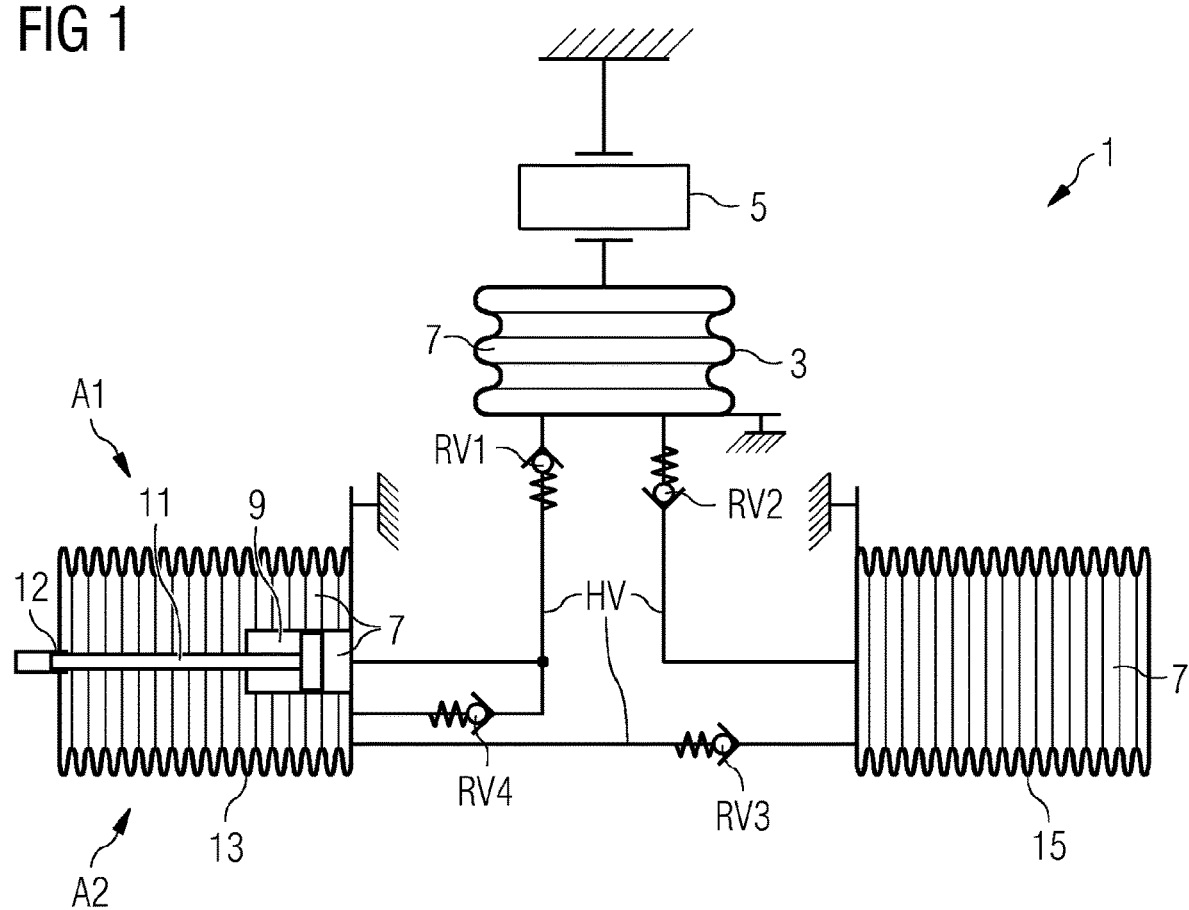
FIG. 1 shows a first example embodiment of a piezohydraulic actuator according to the invention.

Embodiments of the invention provide a piezohydraulic actuator in such a manner that the latter is optimized in a first mode in respect of the force and in a second mode in respect of the speed of the deflection of the actuator, wherein the force is intended to be as great as possible in the first mode and the speed is intended to be as great as possible in the second mode. In addition, an interruption-free switching over between the two modes is intended to be able to be realized. In addition, an automatic switching over is intended to be able to be realized. The actuator is intended to be able to be used in harsh or dirty environments.

Some embodiments provide a piezohydraulic actuator and a method for operating a piezohydraulic actuator.

For example, some embodiments provide a piezohydraulic actuator designed as a system having four chambers, wherein a first chamber is a drive bellows which is movable by a piezo actuator and is filled with a hydraulic fluid and which is hydraulically connected via a first check valve to a second chamber, which is designed as a hydraulic cylinder filled with the hydraulic fluid, as first output, the housing and hydraulic piston of which are coupled mechanically in parallel to an output bellows, which is filled with the hydraulic fluid and forms a third chamber, as second output, wherein the output bellows is hydraulically connected via a second check valve to a fourth chamber, which is filled with the hydraulic fluid, as a reservoir, wherein the latter is hydraulically connected via a third check valve to the output bellows, and the hydraulic cylinder is hydraulically connected via a fourth check valve to the output bellows.

The drive bellows may be a fluid-containing reservoir which is elastic, in particular in the direction of movement, and which is configured in such a manner that force can be applied thereto.

The output bellows may be a fluid-containing reservoir which is elastic, in particular in the direction of movement, and which is configured in such a manner that force can be output therefrom.

Other embodiments provide a method for operating a piezohydraulic actuator designed as a system having four chambers, wherein a first chamber is a drive bellows which is movable by a piezo actuator and is filled with a hydraulic fluid and which is hydraulically connected via a first check valve to a second chamber, which is designed as a hydraulic cylinder filled with the hydraulic fluid, as first output, the housing and hydraulic piston of which are coupled mechanically in parallel to an output bellows, which is filled with the hydraulic fluid and forms a third chamber, as second output, wherein the drive bellows is hydraulically connected via a second check valve to a fourth chamber, which is filled with the hydraulic fluid, as a reservoir, wherein the latter is hydraulically connected via a third check valve to the output bellows, and the latter is hydraulically connected by a fourth check valve to the hydraulic cylinder, wherein a compression, realized by means of the expansion of the piezo actuator, and pressing of the hydraulic fluid against the first check valve takes place, the latter opening at a set pressure and the hydraulic fluid flowing into the hydraulic cylinder and a multiplication or reduction of the piezo stroke being realized, wherein, by means of contraction of the piezo actuator, a negative pressure is generated in the drive bellows in such a manner that the second check valve opens and hydraulic fluid flows from the reservoir into the drive bellows and thus a repeatable pumping cycle is completed.

A piezohydraulic actuator according to embodiments of the may provide the advantage that a deflection can be undertaken therewith both in a force- and speed-optimized manner. The advantage over comparable conventional solutions which operate with transmission stages is that the described system can automatically change between the speed mode and force mode. In particular, it is possible to switch over between the two modes without an interruption. In addition, when metallic encapsulations are used because of metal bellows, this drive is suitable for a harsh environment, for example in the event of heavy vibrations or a high degree of soiling.

In one embodiment, the hydraulic cross section of the hydraulic piston can be smaller than the hydraulic cross section of the third chamber produced as the output bellows and smaller than the hydraulic cross section of the first hydraulic cross section of the first chamber produced as the drive bellows.

The hydraulic cross section of a component may be the surface which is provided by the component and on which a force necessary for a buildup of pressure acts perpendicularly and which is oriented perpendicularly to a direction of movement.

According to a further embodiment, the fourth check valve can be configured in such a manner that, when there is a rise in pressure in the first output as a result of an external counterforce, said check valve opens in such a manner that hydraulic fluid is additionally pumped to the second output.

According to a further embodiment, the third check valve can have a leakage for hydraulic fluid to drift back from the output bellows to the reservoir.

According to a further embodiment, a restrictor for hydraulic fluid to drift back from the output bellows to the reservoir can be hydraulically connected parallel to the third check valve.

According to a further embodiment, the mechanical output can be provided by means of a surface of the hydraulic piston.

According to a further embodiment, the mechanical output can be provided by means of a surface of the third chamber provided as the output bellows, wherein the hydraulic piston can be connected, in particular in a form-fitting or force-fitting manner, to the surface of the output bellows.

According to a further embodiment, the hydraulic cylinder and at least partially the hydraulic piston can be position within the third chamber provided as the output bellows.

According to a further embodiment, the piezo actuator can be electrically activated by means of pulse width modulation of an activation voltage.

According to a further embodiment, the third check valve can open when, as a result of the pumping of the hydraulic fluid into the hydraulic cylinder, a negative pressure is generated in the output bellows, and hydraulic fluid flows from the reservoir into the output bellows.

According to a further embodiment, if the first output moves against a settable counterforce, in particular an obstacle, and the pressure in the hydraulic cylinder increases, the fourth check valve can open and hydraulic fluid can additionally flow from the drive bellows into the output bellows.

According to a further embodiment, when the first output and the second output are retracted, hydraulic fluid can flow back into the reservoir bellows by means of the third check valve.

FIG. 1 shows a first example embodiment of a piezohydraulic actuator 1 according to the invention. FIG. 1 shows the concept according to the invention. The drive element used is a piezo actuator 5 which is coupled to a hydraulic system. The hydraulic system has four chambers. Specifically, a drive 3, a reservoir 15, a first output (A1) and a second output (A2). In this case, the first output (A1) is in the form of a hydraulic cylinder 9 and is permanently connected mechanically both at the housing thereof and at a hydraulic piston 11 to the second output (A2) which is connected in parallel. The first output (A1) has a smaller hydraulic cross-sectional area than the second output (A2) and optionally than the drive 3. In order to activate the actuator 1, a voltage is applied in pulse width modulation (PWM) form. As a result of the increase in voltage of the PWM signal, the piezo actuator 5 expands, as a result of which the fluid 7 in the drive 3 is compressed and the pressure increases because of the virtual incompressibility. The check valve RV1 is thereby opened, and therefore oil as an example embodiment of the hydraulic fluid 7 flows from the drive 3 into the output A1, i.e. into the hydraulic cylinder 9. With a smaller cross section of output A1 in comparison to the drive 3, a multiplication of the piezo stroke takes place. The PWM voltage is then set again to zero at the piezo actuator 5, as a result of which the pressure in the drive 3 is reduced and, because of the reduction in volume of the fluid 7, a negative pressure arises (some of the fluid 7 present in the drive 3 has been pumped beforehand into the output A1). As a result of the negative pressure, the check valve RV2 is opened and fluid 7 is sucked from the reservoir 15 into the drive 3. The PWM voltage can then be increased again and the previously described cycle can be repeated. By means of the repetition, oil as example embodiment for the hydraulic fluid 7 is pumped gradually from the reservoir 15 via the drive 3 into the output A1. As a result of the deflection of the hydraulic piston 11, i.e. of the output A1, the output A2 is likewise deflected since the two outputs are coupled mechanically to each other. Reference sign 12 denotes a fastening point at which an output bellows 13 is connected mechanically to the hydraulic piston 11. Since hydraulic fluid 7 is not actively pumped in the output A2, negative pressure would arise since the quantity of fluid remains constant despite the increasing volume of the second output A2. This would result in a counterforce at the output A1, as a result of which the deflection of the output A1 would be blocked. For this reason, a hydraulic connection which has the check valve RV3 is provided between output A2 and reservoir 15. Said check valve RV3 is opened if, as a result of the pumping of the hydraulic fluid 7 into the output A1, a negative pressure arises in the second output A2. It is thereby ensured in a passive manner that the second output A2 only has a small influence on the expansion of the first output A1.

As soon as the first output A1 is moved or moves against a counterforce, for example as a result of an obstacle, for operation of the actuator 1 a large amount of force has to be built up.

However, this is possible only to a limited extent with the first output A1 since the hydraulic cross-sectional area has been selected to be too small to provide a great multiplication of the speed. The smaller the hydraulic area of the first output A1, the smaller is the output force at a maximum pressure in the first output A1. For this reason, a check valve RV4 is constructed between the first output A1 and the second output A2. If the pressure in the first output A1 rises because of a counterforce, the check valve RV4 is opened, as a result of which the hydraulic fluid 7 is in addition to being pumped to the first output A1 is also pumped into the second output A2. Since the hydraulic cross section is significantly larger in the case of the second output A2, the output force provided by the second output A2 rises in comparison to the first output A1 under the same pressure.

According to this concept, the retraction of the first and of the second output A1 and A2 takes place by means of an in-built leakage. According to FIG. 1, the third check valve RV3 can be provided with a simple leakage, and therefore the hydraulic fluid 7 drifts back slowly from the second output A2 to the reservoir 15.

Figure 2:
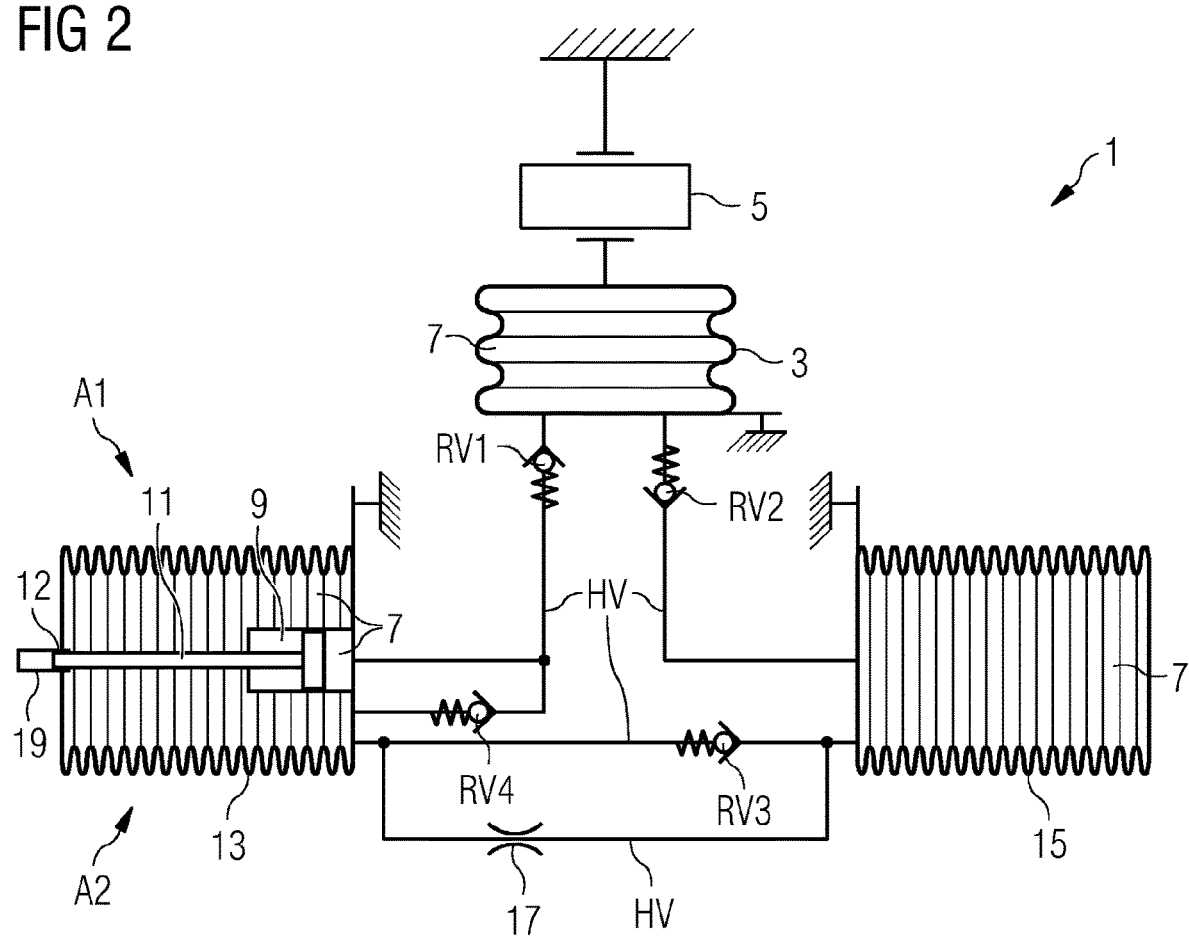
FIG. 2 shows a second example embodiment of a piezohydraulic actuator according to the invention.

FIG. 2 shows a second example embodiment of a piezohydraulic actuator 1 according to the invention. The second example embodiment has substantially the same elements as the first example embodiment according to FIG. 1. As an alternative, according to FIG. 2, a restrictor 17 is additionally installed parallel to the check valve RV3. As an alternative or in addition, the restrictor 17 can provide drifting back of the hydraulic fluid 7 slowly from the second output A2 to the reservoir 15. FIG. 2 shows a surface 19 of the hydraulic piston 11 of the hydraulic cylinder 9, wherein force transmission of the actuator 1 according to the invention is carried out by means of said surface 19.

Figure 3:
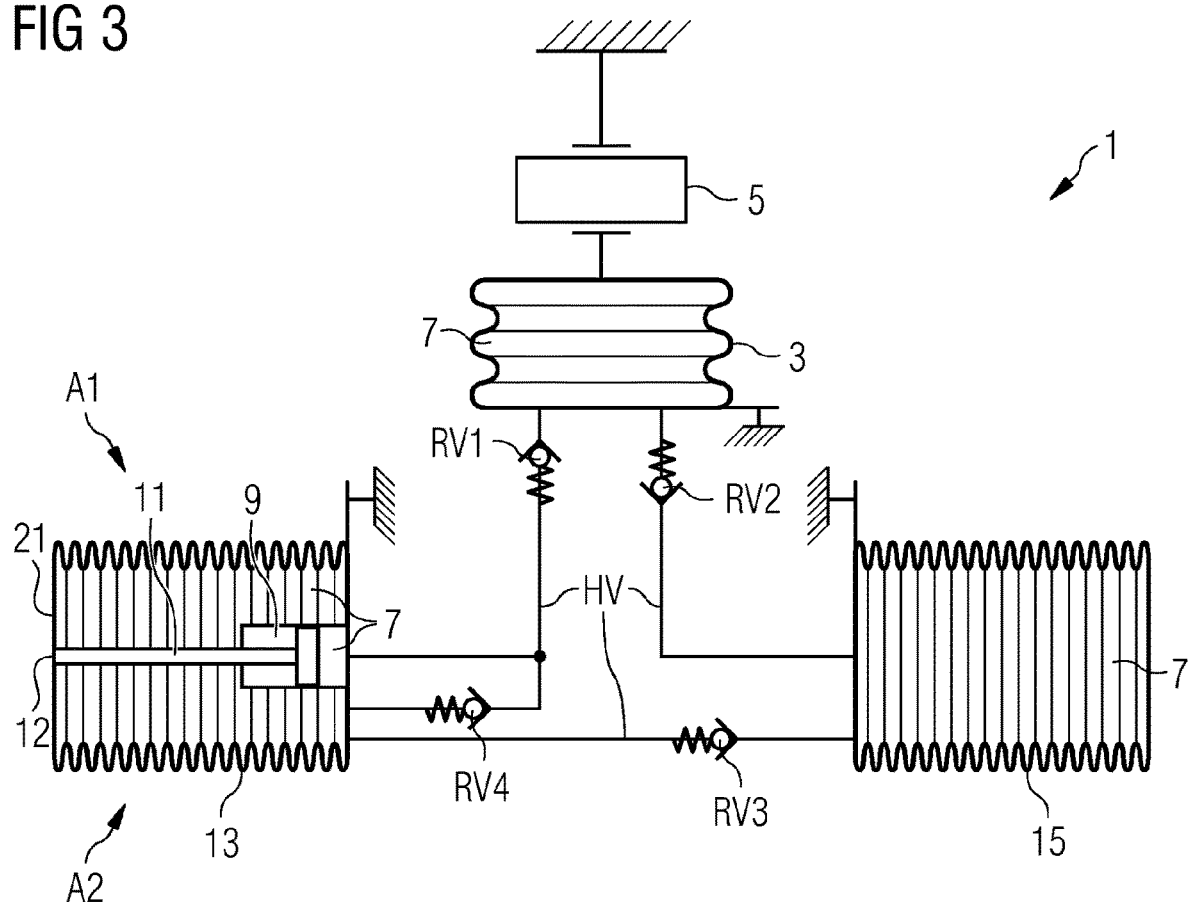
FIG. 3 shows a third example embodiment of a piezohydraulic actuator according to the invention.

FIG. 3 shows a third example embodiment of a piezohydraulic actuator 1 according to the invention. The third example embodiment has substantially the same system elements as the first example embodiment according to FIG. 1. Accordingly, FIG. 3 like FIG. 2 is labeled with the same reference signs as FIG. 1. According to the example embodiment in FIG. 3, in contrast to FIG. 2 the mechanical output does not take place via the surface 19, but rather via the surface 21 which is formed via the output bellows 13 of the second output A2. The hydraulic piston 11 in the second output A2 can be mechanically connected here either in a form-fitting or force-fitting manner at the fastening point of the output bellows 13 to the hollow cylinder piston 11.

Figure 4:
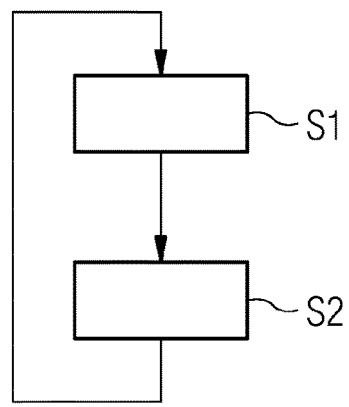
FIG. 4 shows an example embodiment of a method according to the invention.

FIG. 4 shows an example embodiment of a method according to the invention. The method relates to the operation of the piezohydraulic actuator 1 according to the invention, for example in accordance with the above-described example embodiments. By means of a first step S1, the piezo actuator is expanded and the hydraulic fluid compressed and pressed against the first check valve which opens at a set pressure and allows the hydraulic fluid to flow into the hydraulic cylinder and, in the process, a multiplication or reduction of the piezo stroke is carried out.

With a second step S2, the piezo actuator is retracted, with a negative pressure being generated in the drive bellows in such a manner that the second check valve opens and hydraulic fluid flows from the reservoir into the drive bellows and a pumping cycle is thereby completed. Steps S1 and S2 can be repeatedly carried out cyclically.

What is claimed is:

1. A piezohydraulic actuator system, comprising:
   a first chamber defined by a drive bellows filled with a hydraulic fluid and movable by a piezo actuator;
   a second chamber defined by a hydraulic cylinder filled with the hydraulic fluid, which defines a first output;
   a third chamber defined by an output bellows filled with the hydraulic fluid, which defines a second output; and
   a fourth chamber filled with the hydraulic fluid, which defines a hydraulic fluid reservoir;
   wherein the drive bellows defining the first chamber and filled with the hydraulic fluid and is hydraulically connected via a first check valve to the second chamber;
   a hydraulic piston arranged in the hydraulic cylinder and coupled mechanically to the output bellows defining the third chamber;
   wherein the drive bellows defining the first chamber is hydraulically connected via a second check valve to the fourth chamber defining the hydraulic fluid reservoir;
   wherein the hydraulic fluid reservoir is hydraulically connected via a third check valve to the output bellows defining the third chamber, and the hydraulic cylinder defining the second chamber is hydraulically connected via a fourth check valve to the output bellows defining the third chamber.

2. The piezohydraulic actuator of claim 1, wherein a hydraulic cross section of the hydraulic piston is smaller than a hydraulic cross section of the drive bellows defining the first chamber.

3. The piezohydraulic actuator of claim 1, wherein in the fourth check valve is configured such that, when there is a rise in pressure in the first output as a result of an external counterforce, the fourth check valve opens such that additional hydraulic fluid is pumped to the second output.

4. The piezohydraulic actuator of claim 1, wherein the third check valve has a leakage for hydraulic fluid to drift back from the output bellows to the reservoir.

5. The piezohydraulic actuator of claim 4, comprising a restrictor for hydraulic fluid to drift back from the output bellows to the reservoir, the restrictor being hydraulically connected to the third check valve.

6. The piezohydraulic actuator of claim 1, wherein the the hydraulic piston provides a mechanical output.

7. The piezohydraulic actuator of claim 1, wherein: an end of the output bellows defining the third chamber provides a mechanical output, and the hydraulic piston is connected to the end of the output bellows.

8. The piezohydraulic actuator of claim 1, wherein the hydraulic cylinder and at least a portion of the hydraulic piston are positioned within the output bellows defining the third chamber.

9. The piezohydraulic actuator of claim 1, wherein the piezo actuator is electrically activated by pulse width modulation of an activation voltage.

10. A method for operating a piezohydraulic actuator system including:
    a first chamber defined by a drive bellows filled with a hydraulic fluid and movable by a piezo actuator;
    a second chamber defined by a hydraulic cylinder filled with the hydraulic fluid, which defines a first output;
    a third chamber defined by an output bellows filled with the hydraulic fluid, which defines a second output; and
    a fourth chamber filled with the hydraulic fluid, which defines a hydraulic fluid reservoir;
    wherein the drive bellows defining the first chamber and filled with the hydraulic fluid and is hydraulically connected via a first check valve to the second chamber;
    a hydraulic piston arranged in the hydraulic cylinder and coupled mechanically to the output bellows defining the third chamber;
    wherein the drive bellows defining the first chamber is hydraulically connected via a second check valve to the fourth chamber defining the hydraulic fluid reservoir; and
    wherein the hydraulic fluid reservoir is hydraulically connected via a third check valve to the output bellows defining the third chamber, and the hydraulic cylinder defining the second chamber is hydraulically connected via a fourth check valve to the output bellows defining the third chamber;
    wherein the method comprises:
        expanding the piezo actuator, which causes a compression of the drive bellows, which in turn forces the hydraulic fluid against the first check valve, causing the first check valve to open at a set pressure to thereby allow the hydraulic fluid to flow into the hydraulic cylinder and cause a multiplication or reduction of a piezo stroke of the piezo actuator; and
        contracting the piezo actuator, which generates a negative pressure in the drive bellows, which in turn causes the second check valve to open and thereby allow the hydraulic fluid to flow from the reservoir into the drive bellows;
    wherein the expansion and contraction of the piezo actuator define a repeatable pumping cycle.

11. The method as claimed in claim 10, wherein the third check valve opens in response to a negative pressure in the output bellows cause by the pumping of the hydraulic fluid into the hydraulic cylinder, and hydraulic fluid flows from the reservoir bellows into the output bellows via the opened third check valve.

12. The method as claimed in claim 10, wherein, when the first output moves against a counterforce and a pressure in the hydraulic cylinder increases, the fourth check valve opens and additional hydraulic fluid flows from the drive bellows into the output bellows.

13. The method as claimed in claim 10, wherein, when the first output and the second output are retracted, hydraulic fluid flows back into the reservoir bellows via the third check valve.

* * * * *